United States Patent
Stefan

(10) Patent No.: US 10,703,412 B2
(45) Date of Patent: Jul. 7, 2020

(54) PARKING AID FOR PARKING ON AN ONCOMING LANE

(71) Applicant: FORD GLOBAL TECHNOLOGIES, LLC, Dearborn, MI (US)

(72) Inventor: Frederic Stefan, Aachen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 16/157,730

(22) Filed: Oct. 11, 2018

(65) Prior Publication Data

US 2019/0111971 A1  Apr. 18, 2019

(30) Foreign Application Priority Data

Oct. 12, 2017 (DE) .................. 10 2017 218 191

(51) Int. Cl.
*B62D 15/02* (2006.01)
*B60W 30/06* (2006.01)
*G05D 1/00* (2006.01)
*G08G 1/14* (2006.01)

(52) U.S. Cl.
CPC ......... *B62D 15/0285* (2013.01); *B60W 30/06* (2013.01); *G05D 1/0088* (2013.01); *G08G 1/14* (2013.01); *G08G 1/143* (2013.01); *G08G 1/147* (2013.01)

(58) Field of Classification Search
CPC . B62D 15/0285; B60W 30/06; G05D 1/0088; G08G 1/14; G08G 1/143; G08G 1/147
USPC .......................................................... 701/23
See application file for complete search history.

(56) References Cited

U.S. PATENT DOCUMENTS

| | | | | |
|---|---|---|---|---|
| 2007/0063874 A1* | 3/2007 | Danz | ...................... | B60Q 9/006 340/932.2 |
| 2011/0063131 A1* | 3/2011 | Toledo | ................. | B62D 15/027 340/932.2 |
| 2016/0355178 A1* | 12/2016 | Shiraishi | .............. | G05D 1/0088 |
| 2017/0015354 A1 | 1/2017 | Nilsson et al. | | |
| 2019/0036946 A1* | 1/2019 | Ruvio | ..................... | B60R 25/00 |
| 2019/0049997 A1* | 2/2019 | Battles | ................. | G05D 1/0088 |
| 2019/0051061 A1* | 2/2019 | Battles | ................. | G05D 1/0291 |

(Continued)

FOREIGN PATENT DOCUMENTS

| | | |
|---|---|---|
| DE | 102013223417 A1 | 6/2015 |
| DE | 102014107302 A1 | 11/2015 |

(Continued)

OTHER PUBLICATIONS

DE Examination Report DE 10 2017 218 191.5 Filed Jul. 19, 2018. 4 pages.

*Primary Examiner* — Yazan A Soofi
(74) *Attorney, Agent, or Firm* — Frank Lollo; Brooks Kushman P.C.

(57) ABSTRACT

A method is described for parking a vehicle in a parking space. In the method, a parking aid device having a function that parks in a parking space on an oncoming lane is activated. An available parking space on the oncoming lane is located via sensors. A starting position of the vehicle on the oncoming lane for automatic parking in the parking space is established such that upon moving the vehicle on the oncoming lane into the established starting position, and the parking aid device automatically parks the vehicle in the parking space.

20 Claims, 2 Drawing Sheets

(56) References Cited

U.S. PATENT DOCUMENTS

2019/0072974 A1* 3/2019 Hwang ................ G05D 1/0274
2019/0101924 A1* 4/2019 Styler ............... B60W 30/0956
2019/0225267 A1* 7/2019 Ohtani ............... G06K 9/00798

FOREIGN PATENT DOCUMENTS

DE       102015217036 A1    3/2017
EP            2028072 A2    2/2009

\* cited by examiner

PARKING AID FOR PARKING ON AN ONCOMING LANE

CROSS-REFERENCE TO RELATED APPLICATIONS

This application claims foreign priority benefits under 35 U.S.C. § 119(a)-(d) to DE Application 10 2017 218 191.5 filed Oct. 12, 2017, which is hereby incorporated by reference in its entirety.

TECHNICAL FIELD

The present disclosure relates to a method and a device for parking a vehicle in a parking space on the oncoming lane.

BACKGROUND

Parking aid devices for vehicles, in particular motor vehicles, are known in principle from the prior art. Furthermore, lane change assistance systems and lane keeping assistance systems are known. For example, a motor vehicle comprising a lane changing assistance system or a lane keeping assistance system, and also a parking aid system, is described in document EP 2 028 072 B1. In this case, upon operation of the parking aid system during travel, an acquisition region is acquired with the aid of ultrasonic sensors, which are designed for a specific acquisition region, and provided to the mentioned assistance systems.

However, the previously known parking aid systems only permit parking on a presently traveled lane. Moreover, only available parking spaces or parking areas adjoining the presently traveled lane are considered, i.e., for example, in a case of right hand driving, only parking spaces adjoining a right lane.

The extent of autonomy of parking aid systems continuously rises. The coming generation of parking aid systems is to be capable of controlling the vehicle completely, autonomously during an entire parking maneuver, for example, including acceleration, braking, gear shifting, and steering. In this context, it is desirable if parking aid systems are capable of also assuming scouting of surroundings for suitable parking spaces.

A parking aid system typically starts with an observation phase and/or a phase of scouting the surroundings. During this phase, the vehicle either travels autonomously or controlled by the driver at a low velocity, for example, in a range of 10 km/h, wherein sensors that find a suitable parking area and/or a suitable parking space are activated on a side of the vehicle on which the vehicle is to be parked. In the case of right-hand traffic, sensors are typically activated on a right side of the vehicle in this case. If no parking space has been found, the system ends the parking aid function after a specific duration or a specific covered travel distance.

However, situations occur in which no parking space was found along the presently traveled lane, but parking spaces are possibly available on an oncoming lane. Previously known automated parking strategies and parking aid systems are not capable of offering these parking spaces to a user.

SUMMARY

Against the described background, it is an object of the present disclosure to provide an advantageous method for parking a vehicle in a parking space and a parking aid device for a vehicle, which remedy the described disadvantages in conjunction with available parking spaces on an oncoming lane.

The method according to the disclosure for parking a vehicle in a parking space may be implements on a parking aid device, or controller and comprises: activating a parking aid device that comprises a function to park in a parking space on an oncoming lane. An available and/or free parking space on the oncoming lane is located, for example, recognized and identified by sensors. A starting position of the vehicle on the oncoming lane for automated parking in a located parking space is automatically established. The vehicle is moved on the oncoming lane into an established starting position and automatically parked in the located parking space.

The oncoming lane can be a lane opposite or adjacent to a lane presently traveled by the vehicle. In this case, the oncoming lane can be in particular a lane permitted for oncoming traffic.

The method according to the disclosure has an advantage that available parking spaces on or along the oncoming lane are also taken into consideration in conjunction with a parking aid system, in particular during automatic parking. At the same time, power consumption during a phase of searching for a suitable parking space is reduced in this case, since a road traveled along once during a search can be scanned with respect to both lanes or lane edges for available parking spaces and therefore it is not necessary to travel along the oncoming lane a further time.

The parking aid device activates a function to park in a parking space on an oncoming lane, for example, if no available parking space was able to be located within an established time and/or an established distance covered by the vehicle on a hard shoulder adjoining one's own lane.

Locating of an available parking space is preferably performed automatically by at least one sensor. Alternatively, or additionally thereto, the locating of an available parking space can be performed manually by a user, for example a driver, of the vehicle. In this case, a signal is preferably output by the parking aid device to the user, which prompts the user to stop the vehicle on a presently traveled roadway at a position of the parking space located by the user. In principle, the surroundings in a travel direction adjacent to the vehicle, i.e., on a right and/or left adjacent to the vehicle, and/or in front of the vehicle can be observed by at least one sensor to locate an available parking space.

In the case of locating an available parking space manually by a user, after the user has stopped the vehicle on the presently traveled lane at a height of the located parking space, the located parking space on the oncoming lane can be measured by sensors. Furthermore, a trajectory for parking the vehicle in this parking space can be determined. In this context, a starting position for the vehicle for parking in this parking space can be established. In this case, a trajectory of the vehicle to move the vehicle into the established starting position can be determined, and a trajectory for parking the vehicle from the established starting position into the parking space can be determined.

In principle, movement of the vehicle into the established starting position can be performed automatically by a control device, or controller. Alternatively thereto, the movement of the vehicle into the established starting position can be performed manually by the user of the vehicle, after a signal has been output by the parking aid device to the user, which prompts the user to move the vehicle into the established starting position. Establishment of a starting position and automatic or manual movement of the vehicle into the established starting position has the advantage that already known parking aid systems, and possibly already provided systems for the actual parking process, can still be used and these are only supplemented by a function that during a parking space search, parking spaces on or at the oncoming lane are also taken into consideration.

The establishment of the starting position on the oncoming lane can be performed, for example, by the parking aid device. Additionally or alternatively, establishment of a trajectory for moving the vehicle into the starting position can be performed by the parking aid device. In this case, the trajectory can preferably comprise lane changes and/or turning maneuvers, if necessary. Subsequently to the establishment of the starting position, the vehicle is preferably moved along an established trajectory into the established starting position. This can be performed manually by the user, or automatically and/or autonomously. The user can be assisted by an assistance device, for example, by the parking aid device, during the movement of the vehicle along the established trajectory. In this case, individual functions, for example, steering, required gear change, acceleration, or braking, can be performed autonomously.

In a further variant, it is established in the scope of the method whether turning around the vehicle is necessary to park in a located parking space. Additionally or alternatively, it is preferably established whether turning around the vehicle is permissible in present vehicle surroundings. Additionally or alternatively, it can furthermore be established for this purpose whether turning around the vehicle is possible in the present vehicle surroundings.

The establishment of whether turning around the vehicle is permissible can be performed, for example, by recognizing lane markings, for example via a camera and/or GPS, and/or recognizing road signs, for example via a camera. Furthermore, establishment of whether turning around the vehicle is possible can be performed depending on an available space, in particular a width of an available roadway. The described method steps and measures have the advantage that a planned parking process can be planned and carried out reliably in consideration of a traffic situation.

In principle, locating of an available parking space can be performed by sensors listed hereafter in conjunction with the parking aid device according to the disclosure. After reaching the starting position for automatic parking, the sensors that are not required for automatic parking can be deactivated or switched off. This has the advantage that only respective required sensors are activated, and thus superfluous power consumption due to sensors that are unused but activated is avoided.

In principle, signals or messages can be transmitted by the user to the parking aid device in the scope of the described method, which comprise, for example, items of information on a position or further features of a recognized available parking space. In this case, the parking space can have been recognized manually or automatically. The signals or messages transmitted by the user can relate to properties or features of the parking space, which are to be considered from a viewpoint of the user in the scope of a parking procedure.

The parking aid device for a vehicle according to the disclosure comprises a device configured to locate an available parking space on the oncoming lane, a device configured to establish a starting position of the vehicle on the oncoming lane for automatically parking in the located parking space, and a device configured to automatically park the vehicle in the located parking space. The parking aid device according to the disclosure has in principle the same advantages as the above-described method according to the disclosure. It therefore enables, in particular, parking using various degrees of autonomy, wherein available parking spaces on the oncoming lane are efficiently taken into consideration.

The parking aid device preferably comprises a device configure to establish a trajectory of the vehicle for moving the vehicle into an established starting position and/or to park in a located parking space on the oncoming lane. The parking aid device can thus be designed to determine and establish a trajectory of the vehicle from a present position into a parked position or a trajectory of the vehicle from the present position into the established starting position and/or a trajectory of the vehicle from the starting position into the parked position.

In the scope of establishment of trajectories and selection of a suitable trajectory, classifications can be determined that classify, for example, various forms of trajectories into various starting positions. In this manner, a suitable trajectory can be rapidly and efficiently determined and established.

The parking aid device advantageously comprises a device configured to control movement of the vehicle along the established trajectory. In this case, the device configured to control can be designed to automatically control movement along an entire trajectory or automatically control movement along at least a subregion of the trajectory.

The device configured to establish the trajectory is preferably designed to establish a trajectory for a lane change to the oncoming lane and/or a travel direction change. This has an advantage that an entire parking process proceeding from a present vehicle situation can be planned and assisted by the parking aid device.

In a further variant, the device configured to establish a starting position of the vehicle is designed to establish the starting position based on a space available for maneuvering and/or reliability of dimensions or size of a located parking space and/or energy required for carrying out parking of the vehicle. In principle, the device configured to establish a starting position can be designed to establish the starting position in the travel direction immediately in front or immediately behind a located, available parking space.

The device configured to control movement of the vehicle is preferably designed to control the vehicle laterally and longitudinally in relation to a longitudinal axis of the vehicle. Autonomous or semiautonomous parking of the vehicle is enabled in this way.

The device configured to locate an available parking space on the oncoming lane advantageously comprises at least one ultrasonic sensor and/or at least one radar sensor and/or at least one lidar sensor and/or at least one laser sensor and/or at least one camera and/or at least one GPS system and/or at least one navigation system. The mentioned systems and sensors can also be used in the scope of the above-described method according to the disclosure to locate an available parking space.

The device configured to locate an available parking space can comprise sensor groups each having a number of sensors. For example, a first sensor group, which is designed to search the surroundings on the right of the vehicle for an available parking space, and/or a second sensor group, which is designed to search the surroundings on the left of the vehicle for an available parking space, can be provided. Additionally, or alternatively thereto, a third sensor group designed for traffic observation can be provided.

In principle, the parking aid device according to the disclosure can be designed to execute an above-described method according to the disclosure.

The vehicle can in principle be a motor vehicle, for example, a passenger automobile or a utility vehicle or a minivan or van, or a ship. The method according to the disclosure and the parking aid device according to the disclosure can thus be designed for at least one of the mentioned vehicles.

The vehicle according to the disclosure, which can be one of the above-mentioned vehicles, comprises an above-described parking aid device according to the disclosure. The vehicle according to the disclosure has in principle the same properties and advantages as the described parking aid device according to the disclosure and the described method according to the disclosure.

The present disclosure has the following advantages in summary: an improved parking aid for parking both on the lane in the travel direction and also on the oncoming lane is provided. Available parking spaces can be acquired completely and taken into consideration efficiently in the scope of the parking aid device. If necessary, lane change maneuvers and turning maneuvers can be planned and carried out reliably and safely. On the one hand, energy is thus saved and, on the other hand, in the case of internal combustion engines, a quantity of emitted exhaust gases that are caused by long trips to search for a parking space are reduced.

Further features, properties, and advantages of the present disclosure will be described in greater detail hereafter on the basis of exemplary embodiments with reference to the appended figures. All features described above and hereafter are advantageous in this case both individually and also in any arbitrary combination with one another. The exemplary embodiments described hereafter merely represent examples, which do not restrict the subject matter of the disclosure, however.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
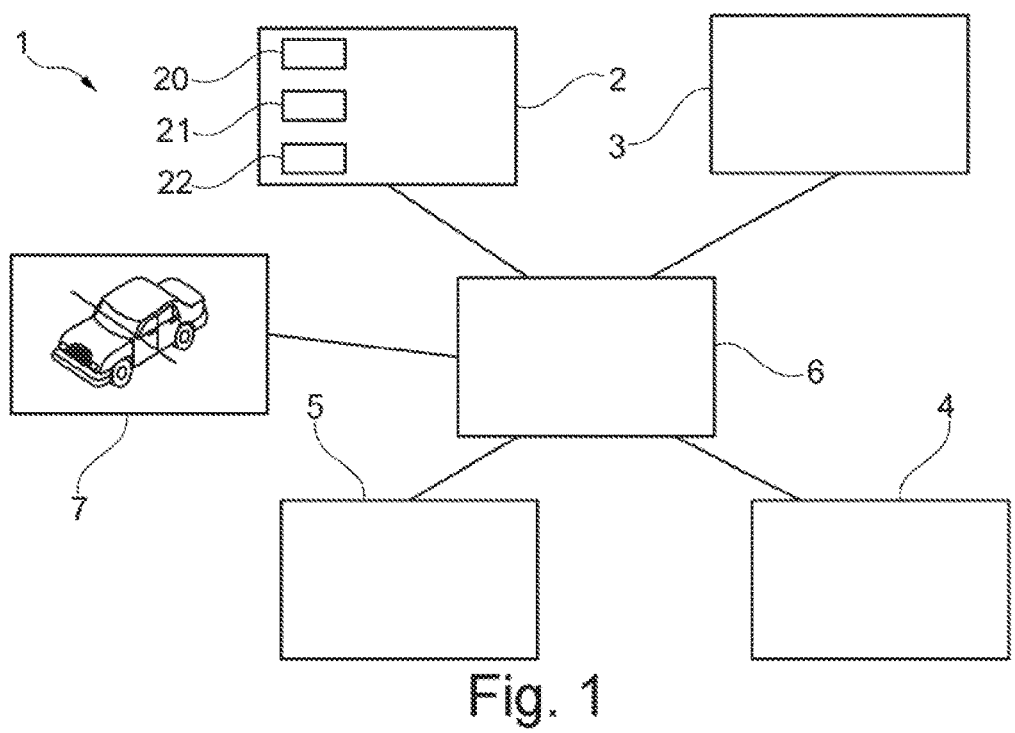
FIG. 1 schematically shows a parking aid device according to the disclosure.

FIG. 1 schematically shows a parking aid device 1 according to the disclosure. The parking aid device 1 comprises a device 2 that locates an available parking space. This device 2 comprises, for example, a number of sensors. The number of sensors can be classified into sensor groups. For example, a first sensor group 20, which is designed to search surroundings on a right of the vehicle for an available parking space, and/or a second sensor group 21, which is designed to search surroundings on a left of the vehicle for an available parking space, can be provided. Additionally or alternatively thereto, a third sensor group 22 designed for traffic observation can be provided. Each of the mentioned sensor groups 20, 21, 22 can comprise, for example, a GPS system and/or a navigation system and/or at least one lidar sensor and/or at least one camera and/or at least one radar sensor.

The parking aid device 1 can optionally comprise a control device 3 configured to activate and deactivate individual sensors or sensor groups. The parking aid device 1 moreover comprises a control device 4 configured to automatically park the vehicle in a parking space, preferably in a located parking space. The control device 4 is preferably designed to control the vehicle in a lateral direction and in a longitudinal direction in relation to a longitudinal axis of the vehicle.

Furthermore, the parking aid device 1 comprises a device 5 configured to establish a starting position of the vehicle on an oncoming lane for automatically parking in the located parking space. This device 5 is identified by the reference numeral 5. The device 5 is preferably also designed to establish a trajectory of the vehicle for moving the vehicle into an established starting position and/or a trajectory of the vehicle for parking in a located parking space on the oncoming lane. Alternatively thereto, an additional device can be provided being configured to establish at least one of the mentioned trajectories. Moreover, the parking aid device 1 can comprise a device 7 for controlling the movement of the vehicle along an established trajectory.

In FIG. 1, the mentioned devices 2, 3, 4, 5, and 7 are connected to a central control device 6. The central control device 6 is designed to receive signals from individual mentioned devices, process the signals, and output the signals to at least one of the mentioned devices 2, 3, 4, 5, and 7. The central control device 6 can be, for example, a computer or a processor (for example, a CPU). Alternatively to the embodiment variant shown, signal or data processing can take place within one or more of the mentioned devices 2, 3, 4, 5, or 7.

Figure 2:
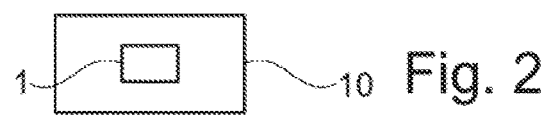
FIG. 2 schematically shows a vehicle according to the disclosure.

FIG. 2 schematically shows a vehicle according to the disclosure, in the following example a motor vehicle 10. The vehicle 10 comprises a parking aid device 1 according to the disclosure.

Various variants of the method according to the disclosure are explained hereafter. In a first variant, locating of the parking space is performed manually and the vehicle 10 does not have sensors that are capable of sampling or scanning or locating parking spaces on the oncoming lane. In this variant, the parking aid device 1 is activated. In a next step, a driver recognizes an available parking space on the oncoming lane. The driver activates a function that parks on the oncoming lane. The parking aid device 1 prompts the driver to move the vehicle 10 into a preferred position in relation to the parking space, for example, to turn around onto the oncoming lane. The driver gives a signal to the parking aid device 1 when a starting position is reached. The parking aid device 1 parks the vehicle automatically.

In a second variant, contrary to the first variant, the vehicle 10 is equipped with at least one sensor, which is designed to locate available parking spaces on the oncoming lane. The vehicle 10 can be embodied, for example, having at least one radar sensor and/or at least one lidar sensor and/or at least one laser sensor. In this variant, an available parking space on the oncoming lane is automatically located by the available device 2 that locates the parking space, which comprises, for example, at least one of the mentioned sensors. The parking aid device 1 informs the driver as soon as a parking space has been found, i.e., a parking space on the oncoming lane or the presently traveled lane. In a next step, the parking aid device 1 prompts the driver to move the vehicle 10 into a specific starting position in relation to the parking space, i.e., possibly to turn the vehicle 10 around and/or to change lanes. The driver subsequently informs the parking aid device 1 that the driver has reached the starting position. The parking aid device 1 thereupon deactivates the sensors that locate parking spaces on the oncoming lane, which are no longer required for the following parking process. In a subsequent step, the parking aid device 1 parks the vehicle 10 in the parking space.

In a third variant, the parking aid device 1 is designed to automatically locate parking spaces, but does not comprise sensors that are designed to recognize parking spaces on the oncoming lane. In this variant, the parking aid device 1 is activated and locating of an available parking space is initiated. If the driver recognizes an available parking space on the oncoming lane, the driver activates a function of parking on the oncoming lane. The parking aid device 1 prompts the driver to move the vehicle 10 to a height of the parking space available on the oncoming lane and stop in this position. If the driver has reached a requested position, the driver thus informs the parking aid device 1. The parking aid device 1 subsequently carries out a lane change and/or a turning maneuver, for example, a U-turn. The parking aid device 1 thereupon moves the vehicle 10 autonomously such that it reaches a specific starting position in relation to a located parking space. In a further step, the vehicle 10 is autonomously parked by the parking aid device 1.

In a fourth variant described hereafter, the vehicle 10, contrary to the third variant, comprises at least one sensor, which is designed to locate an available parking space on the oncoming lane. In this variant, the parking aid device 1 is activated and a locating phase is initiated. The parking aid device 1 observes a presently traveled lane and the oncoming lane with respect to available parking spaces via the device 2 that locates. The device 1 informs the driver as soon as an available parking space has been found. A starting position for parking is established and the vehicle 10, if necessary while carrying out a lane change and/or direction change, is moved into the starting position. In this case, the driving maneuver can firstly be planned and the driver can be informed of the planning before it is carried out. After reaching the established starting position, the vehicle is parked autonomously in the located parking space.

The fourth variant of the method according to the disclosure will be explained in greater detail hereafter by way of example on the basis of FIGS. 3 to 6. FIGS. 3 to 6 each show a road 11 in a top view. The road 11 comprises two lanes 12 and 13, wherein the lane 13 is permitted for oncoming traffic, or the oncoming lane 13. The lane 12 comprises a strip of parking spaces 14, or a hard shoulder for parking. The oncoming lane 13 also comprises a strip of parking spaces 15. A number of motor vehicles 16 are already parked on the strips of parking spaces 14 and 15.

The vehicle 10 according to the disclosure moves in a travel direction 17 on the lane 12 and searches for an available parking space. The parking aid device 1 is activated for this purpose. The parking aid device 1 comprises a first sensor group 20 that locates available parking spaces on the right side of the vehicle 10, a second sensor group 21 that locates available parking spaces on the oncoming lane 13, and a sensor group 22 that locates available parking spaces in front of the vehicle 10.

Figures 4, 5, 6:
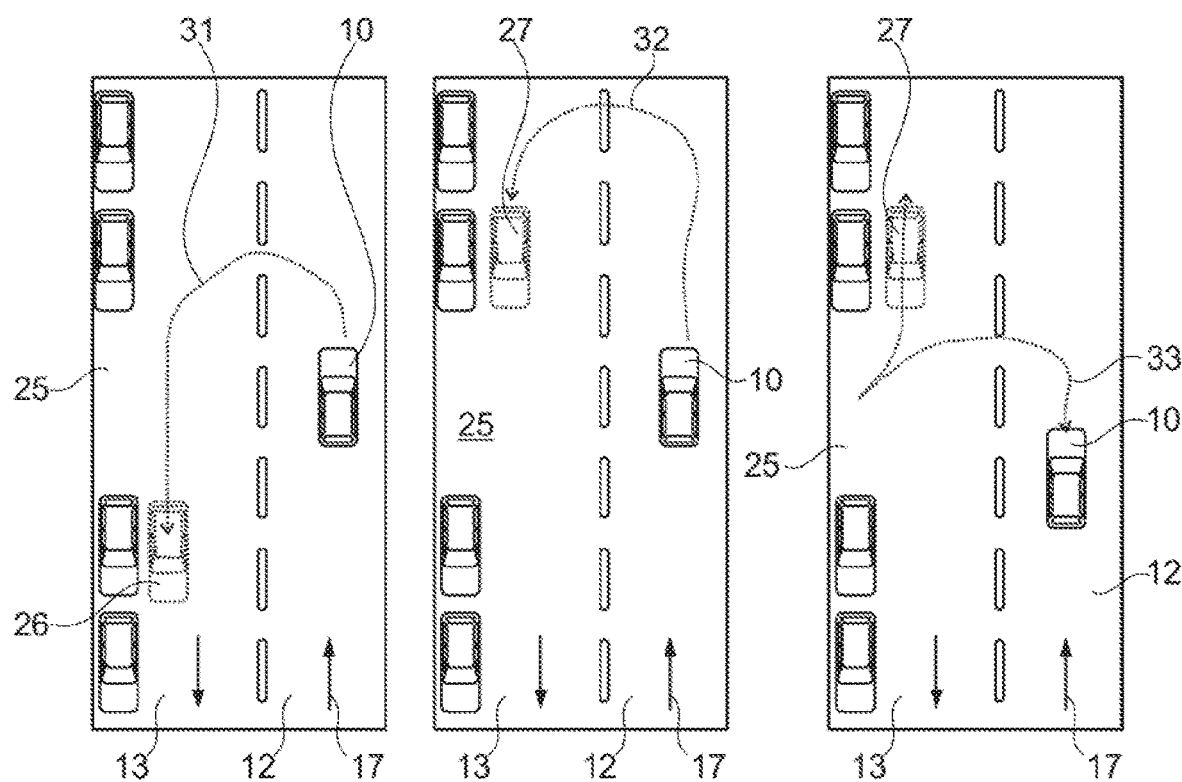
FIGS. 3-6 each show a road having a vehicle according to the disclosure in a top view.
Figure 3:
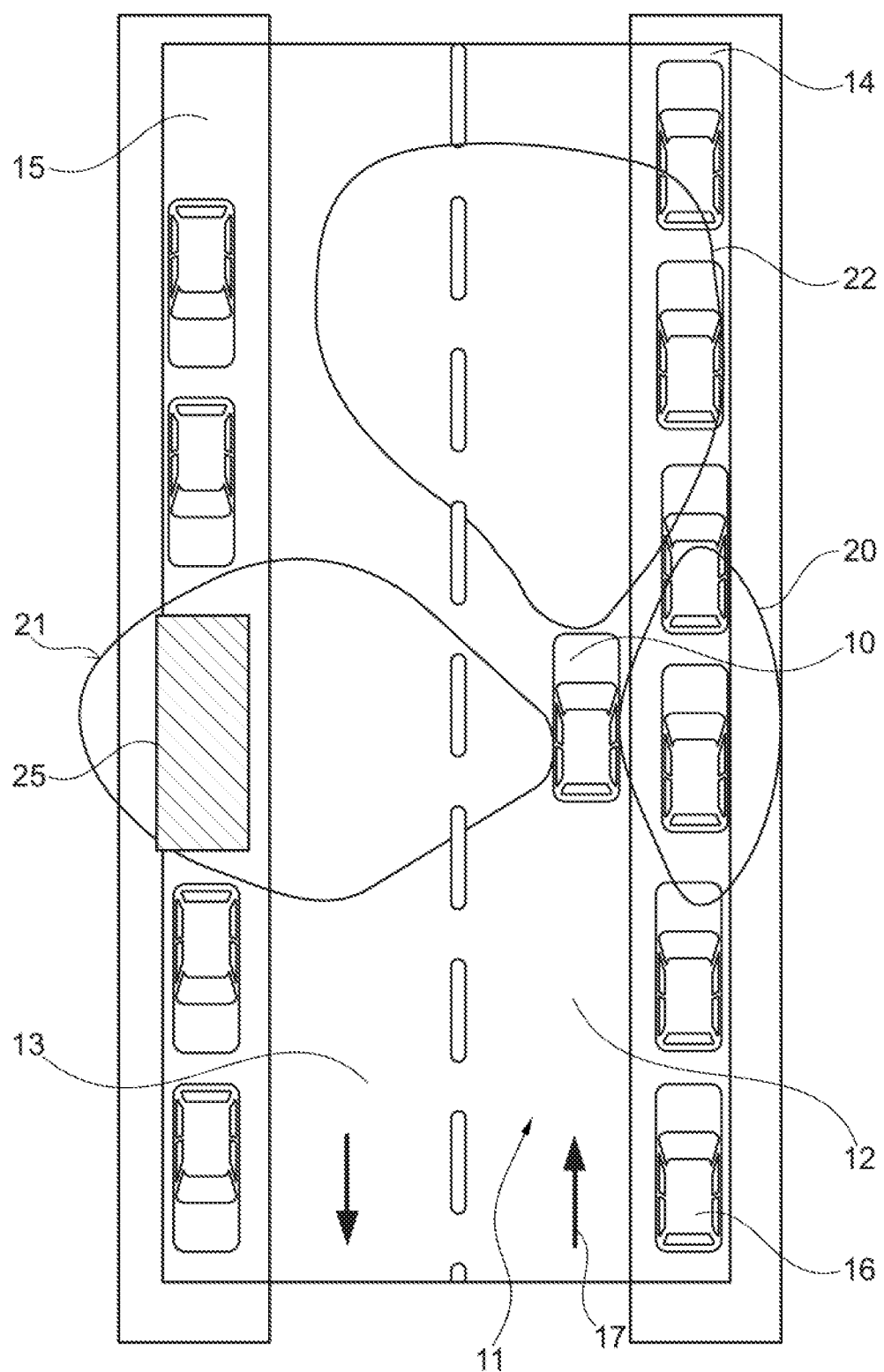

In the variant shown, an available parking space 25 was located on the oncoming lane 13. Signals and data acquired by the sensor group 22 are used, on the one hand, to establish a starting position 26, 27 to park the vehicle 10 and simultaneously establish a trajectory that moves the vehicle 10 into the starting position 26, 27. The starting position 26 can be established, for example, as shown in FIG. 4, immediately in front of the located parking space 25. Alternatively thereto, the starting position 27, as shown in FIGS. 5 and 6, can be established immediately behind the located parking space 25.

Exemplary trajectories that move the vehicle 10 into a respective, established starting position 26 or 27 are identified with reference numerals 31, 32, and 33 in FIGS. 4 to 6. The starting position 26 or 27 can in principle be established in consideration of a size and/or dimensions of the parking space 25, and available space in front and/or behind the parking space 25. The trajectory 31, 32, or 33 that reaches the starting position 26 or 27 can be established, for example, in consideration of space available for a turning maneuver, a size and position of the parking space 25, and/or energy available for the maneuver.

After reaching the starting position 26 or 27, for example, by way of an autonomous movement of the vehicle 10 via the device 1 according to the disclosure, the vehicle 10 is moved, preferably autonomously moved, along the established trajectory 31, 32, or 33.

In the scope of the establishment of trajectories and the selection of a suitable trajectory, classifications can be determined, which classify various shapes of trajectories into various starting positions, for example. Examples of various trajectories that can be used for classification are shown in FIGS. 4 to 6. Depending on a presence of established conditions, for example, one classification can be selected, and a corresponding trajectory can be established in consideration of the parameters of this classification.

Before movement of the vehicle 10 along the established trajectory 31, 32, or 33, oncoming traffic can preferably be observed by the third sensor group 22, and, if necessary, a turning maneuver can be interrupted or aborted. After reaching the starting position 26 or 27, sensors that are no longer necessary can be deactivated. The vehicle 10 can be parked, preferably autonomously, in the parking space 25 in a further step.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for parking a vehicle comprising:
    activating a parking aid device being configured to park in a parking space on an oncoming lane;
    locating an available parking space on the oncoming lane;
    automatically establishing a starting position of the vehicle on the oncoming lane for automatic parking in the parking space;
    moving the vehicle on the oncoming lane into the starting position; and
    automatically parking the vehicle in the parking space.

2. The method as claimed in claim 1, wherein locating of an available parking space is performed manually by a user of the vehicle, and a signal is output by the parking aid device to the user to stop the vehicle on a presently traveled lane at a height of the parking space.

3. The method as claimed in claim 2, wherein moving the vehicle on the oncoming lane into the starting position is performed manually by the user of the vehicle, after a signal has been output by the parking aid device to the user to move the vehicle into the established starting position.

4. The method as claimed in claim 1, wherein automatically establishing the starting position is performed by the parking aid device and establishment of a trajectory that moves the vehicle into the starting position is performed by the parking aid device.

5. The method as claimed in claim 4, wherein the vehicle is moved along the trajectory into the starting position.

6. The method as claimed in claim 1 further comprising establishing a necessity to turn the vehicle around to park in the parking space and a possibility to turn the vehicle in vehicle surroundings.

7. The method as claimed in claim 6, wherein the possibility is determined via GPS, recognition of lane markings and road signs via a camera.

8. A parking aid device for a vehicle comprising:
a control unit configured to, in response to an available parking space on an oncoming lane located via a device, establish a starting position of the vehicle on the oncoming lane to automatically park in the available parking space, and park the vehicle in the available parking space.

9. The parking aid device as claimed in claim 8, wherein the control unit is configured to establish a trajectory of the vehicle that moves into the starting position and establish a trajectory of the vehicle to park in the available parking space on an oncoming lane.

10. The parking aid device as claimed in claim 9, wherein the control unit is configured to control movement of the vehicle along the trajectory.

11. The parking aid device as claimed in claim 8, wherein the control unit is configured to establish a trajectory for a lane change to the oncoming lane and a travel direction change.

12. The parking aid device as claimed in claim 8, wherein the control unit is configured to establish the starting position based on space available to maneuver and reliability of dimensions of the parking space, and energy required to park the vehicle.

13. The parking aid device as claimed in claim 8, wherein the control unit is configured to control the vehicle laterally and longitudinally in relation to a longitudinal axis of the vehicle.

14. The parking aid device as claimed in claim 8, wherein the available parking space is located via at least one ultrasonic sensor, at least one radar sensor, at least one lidar sensor, at least one laser sensor, at least one camera, at least one GPS system, or at least one navigation system.

15. A vehicle comprising:
a parking aid having a control unit being configured to, in response to an available parking space on an oncoming lane located via a camera, establish a starting position of the vehicle, via a navigation system, on the oncoming lane, and park the vehicle in the available parking space.

16. The vehicle as claimed in claim 15, wherein the control unit is configured to establish a trajectory of the vehicle that moves into the starting position and to park the vehicle in the available parking space on an oncoming lane.

17. The vehicle as claimed in claim 16, wherein the control unit is configured to control movement of the vehicle along the trajectory.

18. The vehicle as claimed in claim 15, wherein the control unit is configured to establish a trajectory, via a GPS system, for a lane change to the oncoming lane and a travel direction change.

19. The vehicle as claimed in claim 15, wherein the control unit is configured to establish the starting position based on space available to maneuver and reliability of dimensions of the available parking space, and energy required to park the vehicle.

20. The vehicle as claimed in claim 15, wherein the control unit is configured to control the vehicle laterally and longitudinally in relation to a longitudinal axis of the vehicle.

* * * * *